United States Patent
Pahuja et al.

(10) Patent No.: US 11,790,774 B2
(45) Date of Patent: Oct. 17, 2023

(54) BROADCAST RADIO TRANSMISSIONS TO CONTROL ELECTRONICALLY CONFIGURABLE TRAFFIC SIGNS

(71) Applicant: iBiquity Digital Corporation, Calabasas, CA (US)

(72) Inventors: Ashwini Pahuja, Calabasas, CA (US); Armaan Pahuja, Calabasas, CA (US); Catherine P. Gooi, Calabasas, CA (US); Gabriel Olochwoszcz, Calabasas, CA (US); Marek Milbar, Calabasas, CA (US)

(73) Assignee: IBIQUITY DIGITAL CORPORATION, Columbia, MD (US)

( * ) Notice: Subject to any disclaimer, the term of this patent is extended or adjusted under 35 U.S.C. 154(b) by 0 days.

(21) Appl. No.: 17/943,364

(22) Filed: Sep. 13, 2022

(65) Prior Publication Data
US 2023/0005365 A1    Jan. 5, 2023

Related U.S. Application Data

(63) Continuation-in-part of application No. PCT/US2021/071776, filed on Oct. 7, 2021.
(Continued)

(51) Int. Cl.
*G08G 1/07* (2006.01)

(52) U.S. Cl.
CPC ..................... *G08G 1/07* (2013.01)

(58) Field of Classification Search
CPC ........... G08G 1/07; G08G 1/092; H04W 4/44; H04W 4/50; H04W 12/033; H04W 4/06; H04L 41/0806
See application file for complete search history.

(56) References Cited

U.S. PATENT DOCUMENTS

| 2003/0084108 A1 | 5/2003 | Syed |
| 2006/0020965 A1 | 1/2006 | Steelbert et al. |

(Continued)

FOREIGN PATENT DOCUMENTS

| CN | 110460958 A | 11/2019 |
| EP | 3375148 A1 | 9/2018 |

(Continued)

OTHER PUBLICATIONS

International Search Report and Written Opinion in corresponding International Patent Application No. PCT/JS2021/071776, dated Feb. 7, 2022, 8 pages.

*Primary Examiner* — Sisay Yacob
(74) *Attorney, Agent, or Firm* — Edell, Shapiro & Finnan, LLC.; Charles Middleton

(57) ABSTRACT

A method comprises: generating a traffic sign message configured to configure an active traffic sign that is electronically configurable; encrypting the traffic sign message to produce an encrypted traffic sign message; sending the encrypted traffic sign message to a radio broadcast transmitter; and at the radio broadcast transmitter, transmitting the encrypted traffic sign message in a radio broadcast signal; and at the active traffic sign: receiving the radio broadcast signal and recovering the encrypted traffic sign message from the radio broadcast signal; decrypting the encrypted traffic sign message to produce the traffic sign message; and configuring the active traffic sign according to the traffic sign message.

21 Claims, 15 Drawing Sheets

Related U.S. Application Data

(60) Provisional application No. 63/243,909, filed on Sep. 14, 2021, provisional application No. 63/090,189, filed on Oct. 10, 2020.

(56) References Cited

U.S. PATENT DOCUMENTS

| | | |
|---|---|---|
| 2019/0081718 A1 | 3/2019 | Schuster et al. |
| 2021/0276594 A1* | 9/2021 | Oh .................... H04W 4/44 |
| 2021/0385684 A1* | 12/2021 | Rajab ............ H04W 28/0289 |
| 2022/0101729 A1* | 3/2022 | Dhillon ............. G01C 21/3492 |

FOREIGN PATENT DOCUMENTS

| | | |
|---|---|---|
| KR | 20180117934 A | 10/2018 |
| WO | 2014134670 A1 | 9/2014 |
| WO | 2022/076725 A1 | 4/2022 |

\* cited by examiner

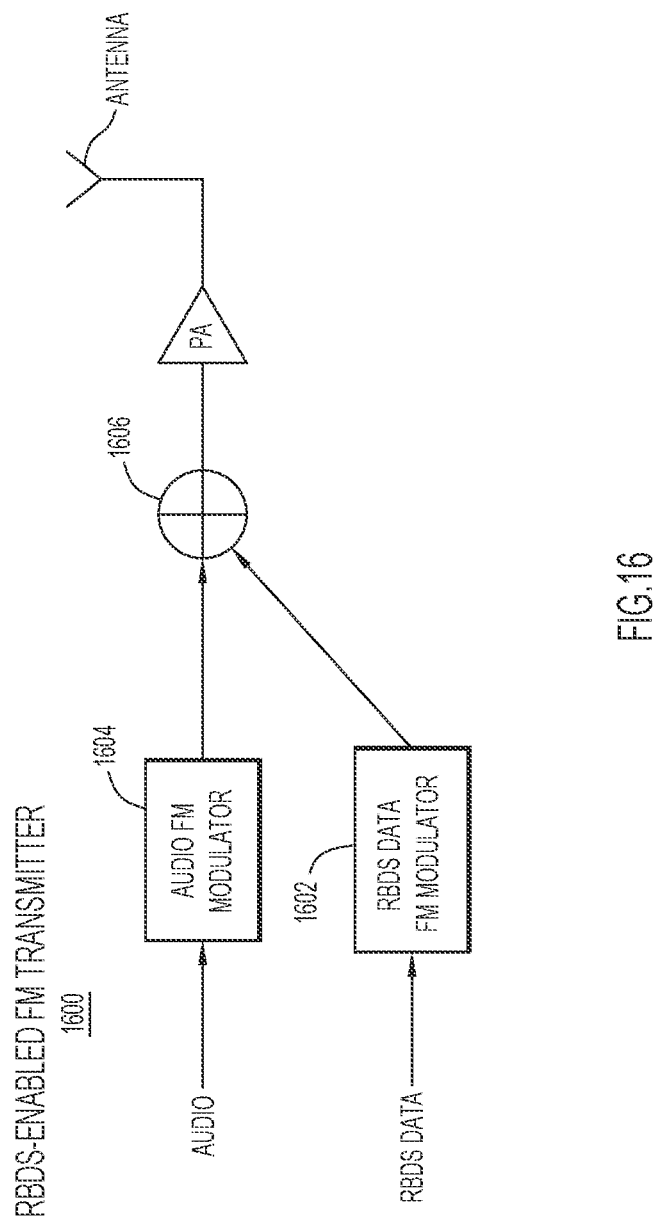

BROADCAST RADIO TRANSMISSIONS TO CONTROL ELECTRONICALLY CONFIGURABLE TRAFFIC SIGNS

CROSS REFERENCE TO RELATED APPLICATIONS

This application is a continuation-in-part of PCT application PCT/US2021/071776 filed on Oct. 7, 2021 titled "SECURE BROADCAST FROM ONE TO MANY DEVICES," which claims priority to U.S. provisional patent application No. 63/090,189 filed on Oct. 10, 2020 titled "INTERNET OF THINGS TRANSMISSION AND RECEPTION SYSTEM AND METHOD," all of which are incorporated herein by reference in their entireties. This application also claims priority to U.S. provisional patent application No. 63/243,909 filed on Sep. 14, 2021 titled "LOW-COST ALTERNATIVE TO CONTROLLING ELECTRONIC TRAFFIC SIGNS," which is incorporated herein by reference in its entirety.

TECHNICAL FIELD

This disclosure relates to configuring and controlling electronically configurable traffic signs using one-way radio broadcasting.

BACKGROUND

Electronically configurable or programmable electronic traffic signs (also referred to as "active traffic signs") positioned along roads may be programmed to provide different messages to vehicular travelers. Some active signs may be programmed by a user manually on-site. Such manual programming is prone to misuse, inconvenient, and inflexible. Alternatively, some active traffic signs may be programmed over cellular and/or Wi-Fi connections to the active traffic signs. Unfortunately, such cellular and Wi-Fi connections could be hacked, thereby exposing remote programming of the active traffic signs to misuse and pranks. Additionally, Wi-Fi and cellular are limited in their coverage by towers/number of users and could be hampered by congested towers.

BRIEF DESCRIPTION OF THE DRAWINGS

FIG. 16 is a simplified block diagram of an example RBDS-augmented/capable transmitter.

DESCRIPTION OF EMBODIMENTS

Embodiments

Embodiments presented herein employ one-way radio broadcast (also referred to as "broadcast radio") transmissions to control or configure (e.g., program) geographically distributed, electronically configurable, electronic traffic signs (referred to herein as "active traffic signs"). The embodiments transmit traffic sign messages targeted to the active traffic signs from radio broadcast stations using various radio broadcast technologies. The traffic sign message can be configured to target a particular active traffic sign or set of active traffic signs. A targeted traffic sign is configured to receive and then decode its own (targeted) traffic sign message. The radio broadcast technologies may include a Radio Broadcast Data System (RBDS) or Radio Data System (RDS) over analog FM radio broadcast, IBOC all-digital radio broadcast, and IBOC hybrid radio broadcast, described below. The embodiments advantageously leverage the publicly accessible, ubiquitous, and low-cost nature of FM radio broadcast coverage. Presently, there are approximately 10,811 FM radio stations across the US (6715 commercial and 4096 non-profit or educational stations) reaching approximately 97% of the population daily. Using the FM band offers a relatively inexpensive way of controlling active traffic signs as it leverages existing infrastructure mostly.

The RBDS (also known as RDS) augments analog FM radio broadcast with a data service, i.e., the RBDS data service, which supports transmission of limited bit rate data per second alongside an analog FM radio channel. A goal of the RBDS is to deliver limited information about the station, program, artist, and song in the limited bit rate data alongside an FM carrier frequency of the radio channel. The RBDS standard leaves room for expansion to user defined applications, as exploited herein. Specifically, embodiments presented herein extend the RBDS to deliver protected (i.e., secure or encrypted) traffic sign messages, configured to program targeted active traffic signs, to the targeted active traffic signs. To this end, the RBDS offers a low-cost global solution for controlling the active traffic signs in regional areas using real-time data transmissions.

Figure 1:
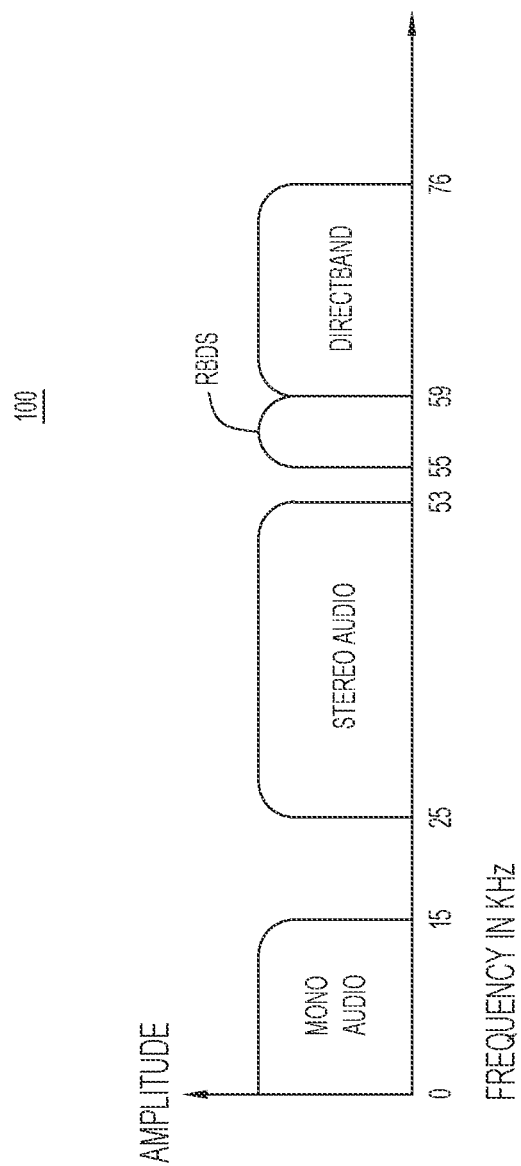
FIG. 1 is an illustration of an example analog frequency modulation (FM) broadcast radio spectrum for an FM radio channel augmented with a transmission spectrum for a radio broadcast data system (RBDS) or Radio Data System (RDS).

FIG. 1 is an illustration of an example analog FM broadcast radio spectrum 100 for an FM radio channel augmented with a transmission spectrum for the RBDS, which may be encoded with one or more secure traffic sign messages. As seen in FIG. 1, RBDS uses 55 kHz-59 kHz. RBDS uses Phase Shift Keying (PSK) modulation having a modulation data rate of 1187.5 bits per second (bps). RBDS employs error detection and correction within an RBDS message payload, which reduces the effective rate of transmission to 731 bps. The RBDS standard in the United States (US) defines various standard and custom data fields for an RBDS data message, including:

a. Program identifier (ID) (PI)—Each radio broadcast station has a unique four-character identifier called the call sign, which utilizes 16 bits.
b. Program Service (PS)—This contains the station name and is 8 characters in size.
c. Radio Text (RT)—This contains the artist name as well as the song title. This is 64 characters in size.
d. Program Type (PTY)—This field tells the content type (rock, talk, news, etc.). This is 5 bits in size.
e. Custom Data fields—this is open for new services and applications, including the applications presented herein, and is also referred to as Open Data Applications (ODAs). The custom data fields may include one or more secure traffic sign messages described below.

The RBDS Data Link Layer (DLL) sends the data in the form of groups which are 104 bits wide. Each group has 4 blocks each 26 bits wide, with 16 bits of data and 10 bits of error correction. The overall raw data rate is 1187.5 bps or 11.4 groups per second. Removal of overhead for error correction reduces the data rate to 731 bps or 91 bytes per second. The effective rate for custom application is 6.2 groups per second or 99.2 bps of actual data.

As an alternative to the RBDS, digital radio broadcasting technology delivers digital audio and data services to radio receivers using existing radio bands. One type of digital radio broadcasting, referred to as in-band on-channel (IBOC) digital radio broadcasting, transmits a digital radio broadcast signal and an analog radio broadcast signal simultaneously on the same frequency using digitally modulated subcarriers or sidebands to multiplex digital information on an amplitude modulation (AM) or frequency modulation (FM) analog modulated carrier signal. HD Radio™ technology, developed by iBiquity Digital Corporation, is one example of an IBOC implementation for simulcast digital radio broadcasting and reception.

With IBOC digital radio broadcasting, signals can be transmitted as: a hybrid radio broadcast signal (also referred to as a "hybrid waveform") including an analog modulated carrier (also referred to as an "analog signal") in combination with a plurality of digitally modulated carriers (also referred to as a "digital signal" and a "digital waveform"); or an all-digital radio broadcast signal (also referred to as an all-digital waveform) from which the analog signal is absent, and only the digital signal is present. Embodiments presented herein may encode the above-mentioned secure traffic sign messages onto the digitally modulated carriers of the IBOC all-digital radio broadcast signal or the IBOC hybrid radio broadcast signal using HD Radio technology, for example. An advantage of using IBOC radio broadcast signals is the relative high data rates that they support for messaging, e.g., approximately 192 kbps, although other data rates are available.

Figure 2:
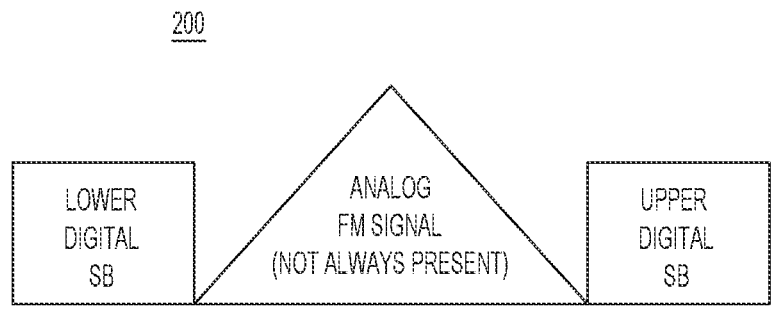
FIG. 2 is an illustration of an example power spectrum for an example in-band on-channel (IBOC) hybrid radio broadcast signal (also referred to as a "hybrid signal") centered on an FM radio channel.

FIG. 2 is an illustration of an example power spectrum 200 for an example IBOC hybrid radio broadcast signal (also referred to as a "hybrid signal") centered on an FM radio channel that may carry an analog FM broadcast radio signal (also referred to as an "analog FM signal"). A center portion of power spectrum 200 comprises the analog FM signal, while upper and lower portions or sidebands (SBs) of the spectrum comprise a digital signal. One or more secure traffic sign messages may be carried in the digital signal. Power spectrum 200 represents a generalized spectral mapping for some service modes in HD Radio, for example. On the other hand, the central analog FM signal may be disabled (i.e., may not be present) for other service modes of HD Radio, resulting in an all-digital signal.

Figure 3:
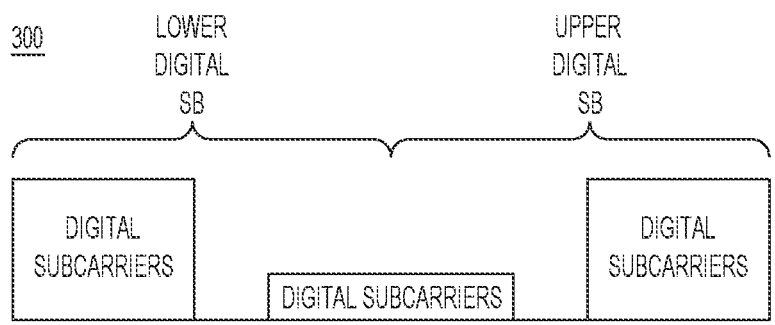
FIG. 3 is an illustration of an example power spectrum for an IBOC all-digital radio broadcast signal (also referred to as an "FM all-digital signal").

FIG. 3 is an illustration of an example power spectrum 300 for an IBOC all-digital radio broadcast signal (also referred to as an "FM all-digital signal"). The all-digital signal is constructed by disabling the central analog signal, and replacing it with additional digital subcarriers, which may carry the secure traffic sign messages in addition to the sideband digital carriers.

Figure 4:
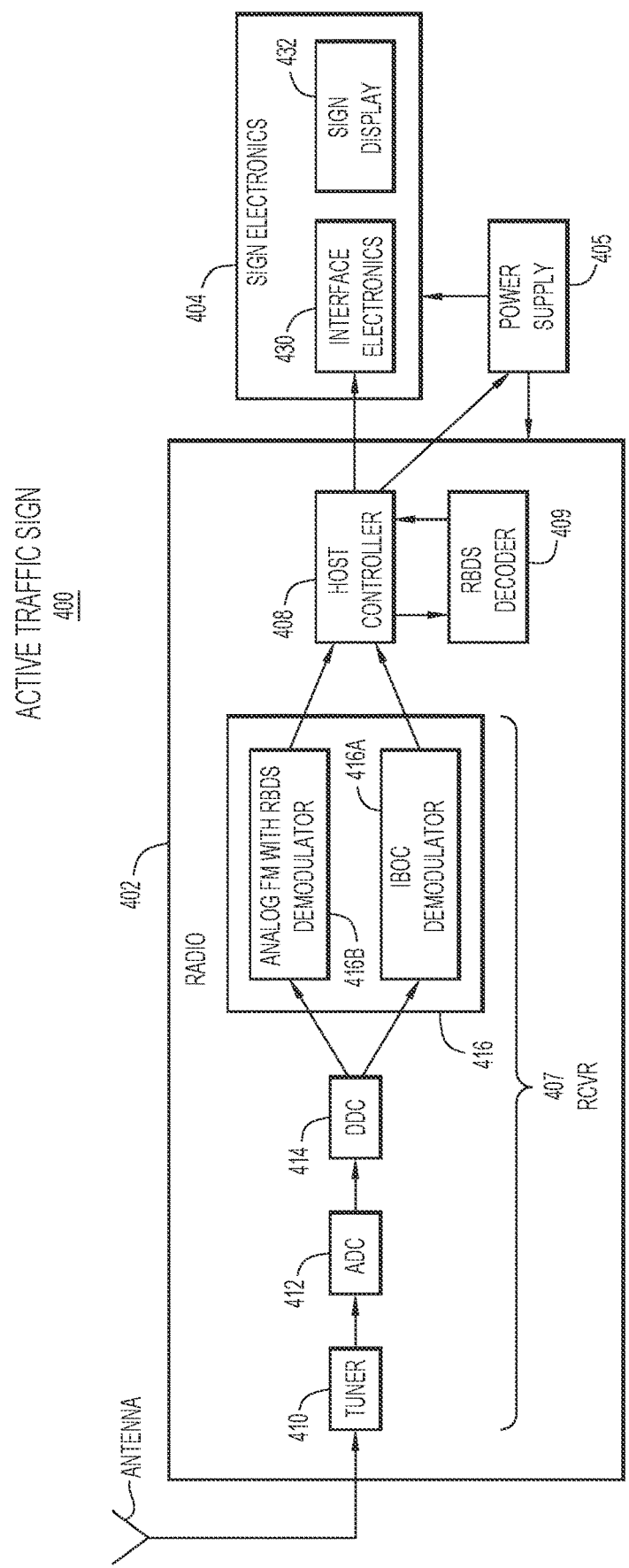
FIG. 4 is a block diagram of an example active traffic sign controlled by FM (analog or digital) transmission.

FIG. 4 is a block diagram of an example active traffic sign 400 (also referred to herein as simply "traffic sign 400"). Active traffic sign 400 may be electronically configured or programmed on demand by sending data to the active traffic sign via the one-way transmission technologies/services described above, provided that the active traffic sign is authorized to decode/use the data, as described below. Active traffic sign 400 includes a receiver system or radio 402 connected to sign electronics 404, and a power supply 405 to provide power to the receiver system and the sign electronics.

Radio 402 includes a receiver (RCVR) 407 to receive a radio broadcast signal from an antenna connected to the receiver, a host controller 408 coupled to the receiver, and an RBDS decoder 409 coupled to the host controller. Receiver 407 includes a tuner 410, an analog-to-digital converter (ADC) 412, a digital down converter (DDC) 414, and a demodulator 416 that includes both an IBOC demodulator 416A (i.e., a digital demodulator) and an analog FM (with RBDS) demodulator 416B. Together, the antenna and tuner 410 deliver a radio broadcast signal received by the antenna on a given frequency channel selected by the tuner to ADC 412 and DDC 414, which digitize and digitally down convert the radio broadcast signal to a baseband signal including I and Q sample pairs.

In a first example, an RBDS encoded encrypted traffic sign message is carried in a received analog FM radio broadcast signal augmented with the RBDS. In that case, the analog FM demodulator 416B demodulates the analog FM radio broadcast signal augmented with the RBDS as represented in the baseband signal, to recover the RBDS encoded encrypted traffic sign message from the RBDS spectrum. Analog FM demodulator 416B may employ any known or hereafter developed analog FM demodulation technique to recover the RBDS encoded encrypted traffic sign message from the RBDS augmented analog FM radio broadcast signal. Analog FM demodulator 416B forwards the RBDS encoded encrypted traffic sign message to host controller 408, which forwards the RBDS encoded encrypted traffic sign message to RBDS decoder 409. RBDS decoder 409 RBDS decodes the RBDS encoded traffic sign message, and forwards the encrypted traffic sign message to host controller 408. RBDS decoder 409 may use any known or hereafter developed RBDS decoding technique to perform the RBDS decode operation.

In a second example, an encrypted traffic sign message is carried as digital data in a received IBOC hybrid radio broadcast signal or a received IBOC all-digital radio broadcast signal. In that case, the IBOC demodulator 416A demodulates the digitally modulated portions of the IBOC radio broadcast signal as represented in the baseband signal, to recover the encrypted traffic sign message. IBOC demodulator 416A may employ any known or hereafter developed IBOC/digital demodulation technique to recover the encrypted traffic sign message from the baseband signal. IBOC demodulator 416A forwards the encrypted traffic sign message to host controller 408.

Host controller 408 includes memory to store information unique to active traffic sign 400, such as a unique traffic sign ID (e.g., a traffic sign serial number, a traffic sign name, a traffic sign address, or several of the foregoing), a local key to decrypt encrypted traffic sign messages, and so on. Whether host controller receives the encrypted traffic sign message from the analog FM demodulator 416B or the IBOC demodulator 416A, the host controller decrypts the encrypted traffic sign message using the local key to recover the traffic sign message, and forwards the traffic sign message to sign electronics 404.

Sign electronics 404 includes interface electronics 430 coupled to and configured to drive a sign display 432, such as a flat panel display, an array of lights (e.g., light emitting diodes (LEDs)), and so on. Interface electronics 430 may include a controller and other circuitry configured to perform the operations described herein. Upon receiving the traffic sign message, interface electronics 430 converts the traffic sign message to control signals, and provides the control signals to sign display 432, which cause the sign display to display indicia indicated in the traffic sign message, for example.

Receiver 407 of active traffic sign 400 includes both IBOC demodulator 416A and analog FM demodulator 416B (and associated RBDS decoder 409) by way of example, only. In other examples, receiver 407 may include only the IBOC demodulator or only the analog FM with RBDS demodulator (with the associated RBDS decoder 409).

Figure 5:
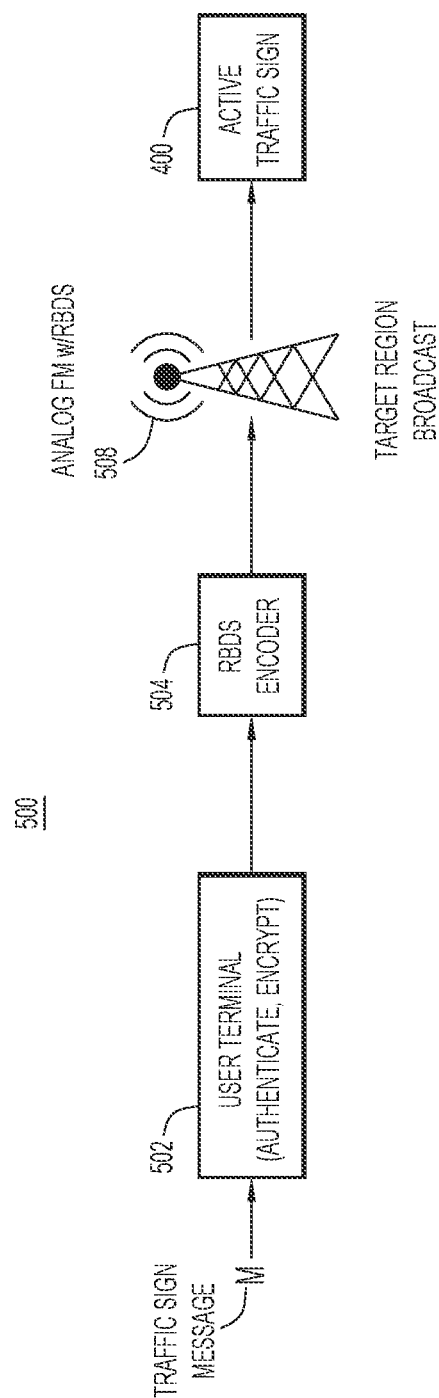
FIG. 5 is a block diagram of an example one-to-one (1:1) one-way transmission system that uses the RBDS to deliver a traffic sign message to an active traffic sign.

FIG. 5 is a block diagram of an example one-to-one (1:1) one-way transmission system 500 that uses the RBDS to deliver a traffic sign message to an active traffic sign. One-way transmission system 500 includes a user terminal 502, an RBDS encoder 504 coupled to the user terminal, a target region broadcaster 508 (i.e., a radio broadcast transmitter or station) coupled to the RBDS encoder, and an active traffic sign 400. RBDS encoder 504 may be any known or hereafter developed RBDS encoder. RBDS encoder 504 may be an on-premises RBDS encoder that is co-located with target region broadcaster 508. User terminal 502 generically represents any known or hereafter developed mechanism by which a user may enter a traffic sign message M into the system, including a client application or application programming interface (API) hosted on a computer device, a web-based user portal connected to a server, a graphical user interface (GUI), and so on. In one example, user terminal 502 hosts a traffic sign message client application (referred to simply as a "client application") configured to enable the user to enter/create a traffic sign message targeted to one or more active signs through one or more target region broadcasters (i.e., target radio broadcast transmitters).

In the example, the user logs into the client application using a user identifier (ID), and the client application authenticates the user (and any messages subsequently entered by the user) based on the user ID. Once authenticated, the user creates a traffic sign message M particularly targeted to active traffic sign 400. The traffic sign message may include certain information, entered by the user and/or accessed from local or remote databases, targeting active traffic sign 400. For example, the traffic sign message includes a "message type" encoded with a value to indicate "traffic sign," a unique traffic sign ID particular to active traffic sign 400 (e.g., a traffic sign serial number, a traffic sign name, a traffic sign address, or several of the foregoing), an optional transmitter ID (e.g., serial number, address, or other identifier) for target region broadcaster 508, and message information (i.e., a message payload) to control the active sign. The traffic sign message may include additional information described below by way of example.

The message payload may include instructions to configure/control the active traffic sign and/or indicia (e.g., alphabetic and/or alphanumeric characters, and the like) to be displayed by the active traffic sign. The traffic sign message may be configured to program the active traffic sign in accordance with standards from the Federal Highway Administration (FHWA), for a variable message sign (VMS), an electronic message sign (EMS), and a dynamic message (DM) sign, for example. The traffic sign message may give information to travelers regarding traffic congestion routing and updates, construction detour routing, amber, silver, and blue alerts, and the like.

Table 1 below is an example format for the traffic sign message. Other formats may include different field sizes and specify different parameters, e.g., different character lengths, and so on.

TABLE 1

| Product Type | 4 bits | Ability to support multiple type of products, e.g., a traffic sign |
|---|---|---|
| Product ID | 4 | Ability to support multiple type of manufacturers |
| Serial number/ID and/or network address | 16 | Allows targeting of a specific device |
| Start time | 11 | Advise the system (traffic sign) when to activate the payload message |
| Duration | 5 | Effective duration of the activation |
| Sign Size | 3 | Support of up to 36 characters |
| Spacing | 3 | Spacing of characters as required by Highway administration |
| Message (payload) | 252 | Supporting a maximum of 36 characters, with each character needing 7 bits to represent letters on a keyboard (mostly alphabets) |
| Encryption | 128 | Encryption size for example (AES-128) |
| Length of total message | 9 | Cumulative sum of all the bits to be sent |
| Total | 440 | Total number of bits required to send the message |

User terminal 502 encrypts the traffic sign message using a local key (e.g., the user ID, the traffic sign ID, or any other suitable key that is also know to active traffic sign 400) to produce an (authenticated) encrypted traffic sign message, and forwards the same to RBDS encoder 504. The encryption may use Advanced Encryption Standard (AES) encryption, for example. RBDS encoder 504 RBDS encodes the encrypted traffic sign message to produce an RBDS encoded encrypted traffic sign message (also referred to simply as an "RBDS traffic sign message"), and forwards the same to an RBDS interface of target region broadcaster 508, which generates an analog FM radio broadcast signal augmented with the aforementioned RBDS message. Target region broadcaster 508 transmits the analog FM radio broadcast signal augmented with the RBDS message. Target region broadcaster 508 may repeatedly transmit the traffic sign message over time.

Targeted active traffic sign 400 receives the RBDS augmented analog FM radio broadcast signal transmitted by target region broadcaster 508. Active traffic sign 400 demodulates the received signal to recover the RBDS encrypted traffic sign message, and RBDS decodes the same to recover the encrypted traffic sign message. Active traffic sign 400 decrypts the encrypted traffic sign message using a local key that matches the key used by user terminal 502 for encryption, to recover the traffic sign message entered by the user at user terminal 502.

Active traffic sign 400 (e.g., host controller 408) determines whether the traffic sign message targets the active traffic sign. For example, active traffic sign 400 compares the traffic sign ID (e.g., serial number, address, or other target ID) within the traffic sign message to a locally stored traffic sign ID for the active traffic sign. When there is a match, indicating that the traffic sign message targets active traffic sign 400, the active traffic sign uses the payload of the traffic sign message to update operations of/configure the active traffic sign, as described above in connection with FIG. 4. On the other hand, when there is not a match, indicating that the traffic sign message is not targeted to active traffic sign 400, the message is discarded.

Figure 6:
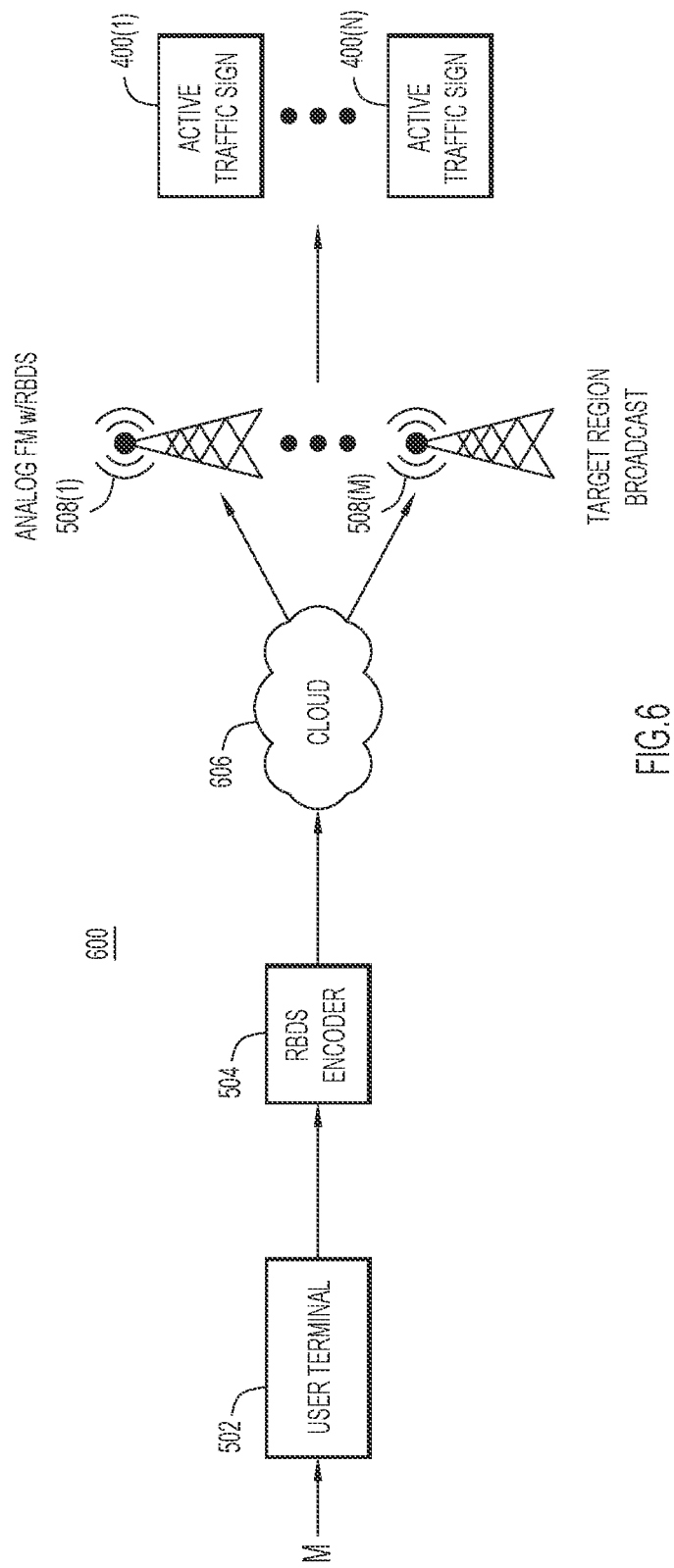
FIG. 6 is a block diagram of an example one-to-many (1:N) one-way transmission system that uses the RBDS to deliver a traffic sign message to multiple active traffic signs through multiple target region broadcasters.

FIG. 6 is a block diagram of an example one-to-many (1:N) one-way transmission system 600 that uses the RBDS to deliver traffic sign message M (or multiple such messages) to multiple active traffic signs 400(1)-400(N) through multiple target region broadcasters 508(1)-508(M). To this end, one-way transmission system 600 further includes a communication network or cloud 606 connected to RBDS encoder 504 and/or the user terminal, and connected to target region broadcasters 508(1)-508(M). Cloud 606 may include one or more local area networks (LANs) and one or more wide area networks (WANs), such as the Internet. The various components of one-way transmission system 600 operate similarly to their corresponding components of FIG. 5, except for the following differences.

In the example of FIG. 6, the client application hosted on user terminal 502 may include a client API, which supports multiple client sessions with corresponding ones of target region broadcasters 508(1)-508(2) over cloud 606, using any known or hereafter developed network protocol, such as Transmission Control Protocol (TCP)/Internet Protocol (IP) (TCP/IP). Under control of the client API, the user may construct encrypted traffic sign messages targeted to particular ones of target region broadcasters 508(1)-508(M) (e.g., using IP addresses of the transmitters) and to particular ones of active traffic signs 400(1)-400(N) (e.g., using the traffic sign IDs). The client API delivers the messages to the targeted region broadcasters through RBDS encoder 504 and cloud 606. For example, the aforementioned messages may be carried in IP packets with destination IP addresses of target region broadcasters 508(1)-508(M). As described above, target region broadcasters 508(1)-508(M) transmit their respective RBDS encoded encrypted traffic sign messages using analog FM radio broadcast signals augmented with the RBDS.

Various example techniques associated with delivering the traffic sign messages through cloud 606 may be found in the following co-pending, co-owned, PCT publications, which are all incorporated herein by reference in their entireties: WO 2022/077019 A1 to A. Pahuja et al., filed 7 Oct. 2021, published 14 Apr. 2022; and WO 2022/076725 A1 to A. Pahuja et al., filed 7 Oct. 2021, published 14 Apr. 2022.

Figure 7:
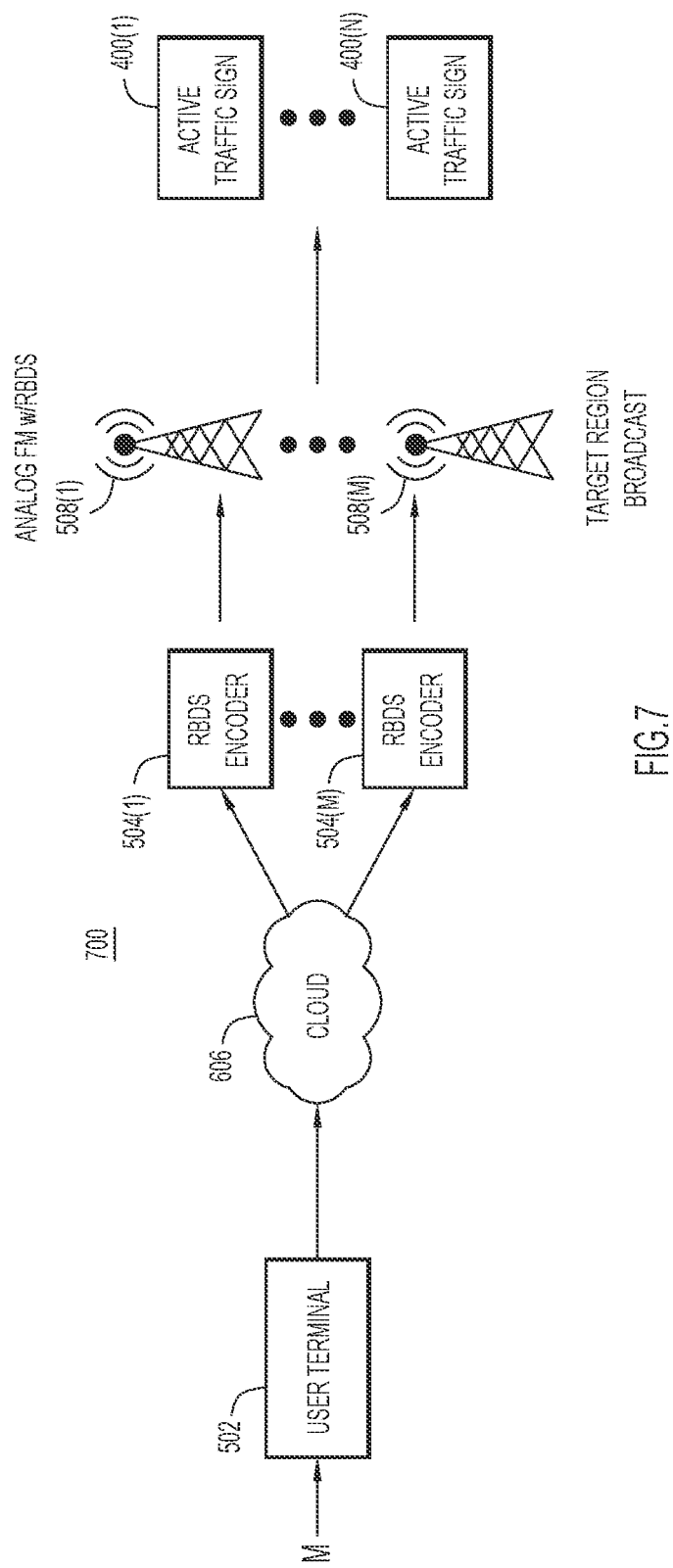
FIG. 7 is a block diagram of another example one-to-many (1:N) one-way transmission system that uses the RBDS to deliver a traffic sign message to multiple active traffic signs through multiple target region broadcasters.

FIG. 7 is a block diagram of another example one-to-many (1:N) one-way transmission system 700 that uses the RBDS to deliver traffic sign message M (or multiple such messages) to multiple active traffic signs 400(1)-400(N) through multiple target region broadcasters 508(1)-508(M). One-way transmission system 700 differs from one-way transmission system 600 in that, from the perspective of message traffic flow, multiple RBDS encoders 504(1)-504(M), positioned after cloud 606, replace the single pre-cloud RBDS encoder of one-way transmission system 600. RBDS encoders 504(1)-504(M) are co-located with, and feed, respective RBDS encoded encrypted traffic sign messages to corresponding ones of target region broadcasters 508(1)-508M).

Figure 8:
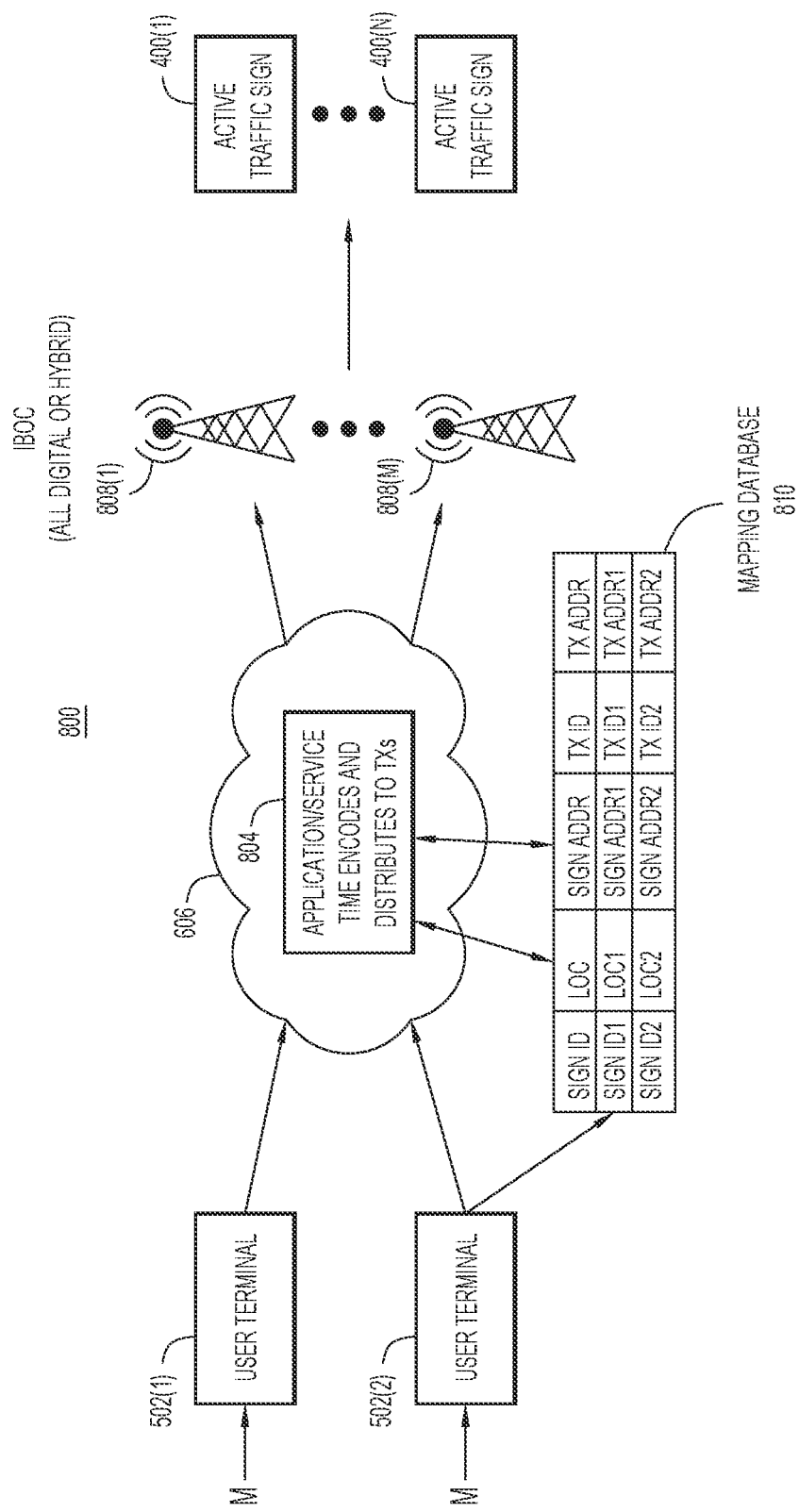
FIG. 8 is a block diagram of an example one-to-many (1:N) one-way transmission system that uses IBOC radio broadcast signals to deliver multiple traffic sign messages from multiple user terminals to multiple active traffic signs through multiple IBOC-equipped target region broadcasters.

FIG. 8 is a block diagram of an example one-to-many (1:N) one-way transmission system 800 that uses IBOC radio broadcast signals to deliver multiple traffic sign messages from multiple user terminals 502(1), 502(2) to multiple active traffic signs 400(1)-400(N) through multiple IBOC-equipped target region broadcasters 808(1)-808(M). User terminals 502(1), 502(2) each host a client API through which the local user accesses a cloud-based application/service 804 including one or more servers to store information, for example. User terminals 502, 502(1) authenticate and encrypt (using local keys) respective traffic sign messages entered into the user terminals, and access application/service 804 to target the encrypted traffic sign messages to (i) particular ones of IBOC-equipped target region broadcasters 808(1)-808(M), which may be the same as target region broadcasters 805(1)-805(M), and (ii) particular ones of active traffic signs 400(1)-400(N). Application/service 804 delivers the encrypted traffic sign messages to target region broadcasters 808(1)-808(M). Application/service 804 may also encode the encrypted traffic sign messages with timing information, prior to their delivery to target region broadcasters 808(1)-808(M).

In an example, user terminals 502(1), 502(2) (or application/service 804) may retrieve routing information from a cloud-based (or, in some examples, a local) mapping database 810 configured with predetermined mapping entries that map active traffic signs to their target region broadcasters. The information may assist with determining which of the region broadcasters should receive which encrypted traffic sign messages. Each entry or row of mapping database 810 includes an active traffic sign identifier (e.g., sign ID1), a geographical location or region for the sign (e.g., Loci), a sign network address (e.g., IP address Addr1), a transmitter ID (e.g., TX ID1) mapped to the sign (e.g., the transmitter ID for the transmitter that broadcasts over a coverage area encompassing the location of the sign), and a transmitter network address (e.g., IP address TX addr1). Each entry may also include a transmitter technology (not shown), such as IBOC or RBDS, for example. Entries of mapping database 810 may be searched to identify and retrieve a transmitter ID and its network address using a traffic sign ID entered in a traffic sign message. The user terminal may perform the search and retrieval when construction a traffic sign message, or a cloud-service may perform the search and retrieval when routing a traffic sign message to a particular target region transmitter.

More generally, the application/service 804 stores a list of target region broadcasters along with their geographical broadcast regions (e.g., in mapping database 810). When the user executes the client API on any of the user terminals, the client API retrieves the list of target region broadcasters and their geographical regions from application/service 804, and presents the information to the user as selectable options. The client API receives, from the user, selections of the radio broadcast stations for transmitting one or more traffic sign messages to one or more active traffic signs. Using the client API, the user can select the region and/or the radio broadcast stations authorized for transmission. The user enters the traffic sign messages into the client API. The client API encrypts the traffic sign messages, and submits the encrypted traffic sign messages to the application/service 804. The application/service 804 may determine a schedule for the encrypted traffic sign messages, and routes the encrypted traffic sign messages to their designated/target region broadcaster (which may be identified in the traffic sign messages or in wrapper encapsulating the encrypted traffic sign messages) at their scheduled times.

When each target region broadcaster 808(i) receives an encrypted traffic sign message, the target region broadcaster transmits the encrypted traffic sign message in an IBOC radio broadcast signal. In turn, each active traffic sign 400(i) receives and demodulates the IBOC radio broadcast signal to recover the encrypted traffic sign message. Each active traffic sign 400(i) decrypts (or attempts to decrypt) the encrypted traffic sign message using a local key, to recover the traffic sign message, assuming the keys match. Each active traffic sign 400(i) determines whether it is the targeted by the traffic sign message based on the address or traffic sign ID in the traffic sign message. When targeted, each active traffic sign 400(i) configures itself based on the payload of the traffic sign message, as described above.

Geographical targeting of active traffic signs for various transmission scenarios are described below in connection with FIGS. 9-11. The transmission scenarios apply equally to both IBOC radio broadcast signals and analog FM with RBDS signals.

Figure 9:
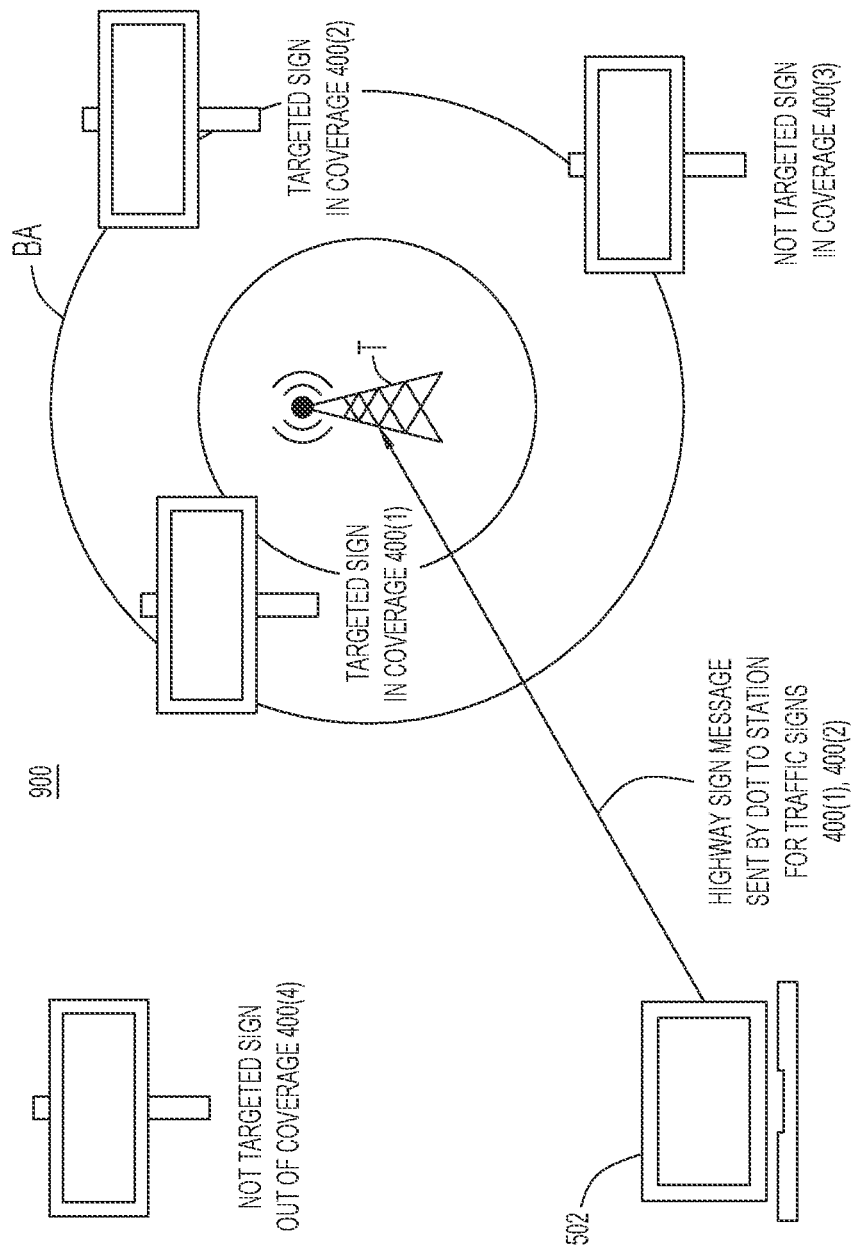
FIG. 9 is an illustration of an example transmission coverage scenario.

FIG. 9 is an illustration of an example 1:1 transmission scenario 900. In transmission scenario 900, user terminal 502 may be located in a traffic sign controller entity, such as the Department of Transportation (DOT), and may be operated by a traffic control administrator or customer. User terminal 502 sends, to radio broadcast transmitter T (e.g., 508(1) or 808(1)), a traffic sign message targeted to active traffic signs 400(1), 400(2), only. For example, the traffic sign message may include unique traffic sign IDs ID1, ID2 for active traffic signs 400(1), 400(2), respectively. As described above, the traffic sign message may be encrypted, and may be RBDS encoded when RBDS is used. Radio broadcast transmitter T broadcasts the traffic sign message in a radio broadcast signal (either an RBDS augmented analog FM radio broadcast signal or an IBOC radio broadcast signal) across a broadcast coverage area BA served by the transmitter. Both targeted active traffic signs 400(1), 400(2) are located in coverage area BA, receive the radio broadcast signal, recover the traffic sign message, and use its payload to configure local traffic sign electronics. On the other hand, non-targeted active traffic sign 400(3), positioned within coverage area BA, receives the radio broadcast signal but is not targeted by the traffic sign message, i.e., the traffic sign ID carried in the traffic sign message does not match the traffic sign ID for traffic sign 400(3). Therefore, non-targeted active traffic sign 400(3) may not be able to decrypt the message, or otherwise decode and use the message to configure its local traffic sign electronics. Active traffic sign 400(4) is outside of coverage area BA and therefore does not receive or demodulate the radio broadcast signal.

Figure 10:
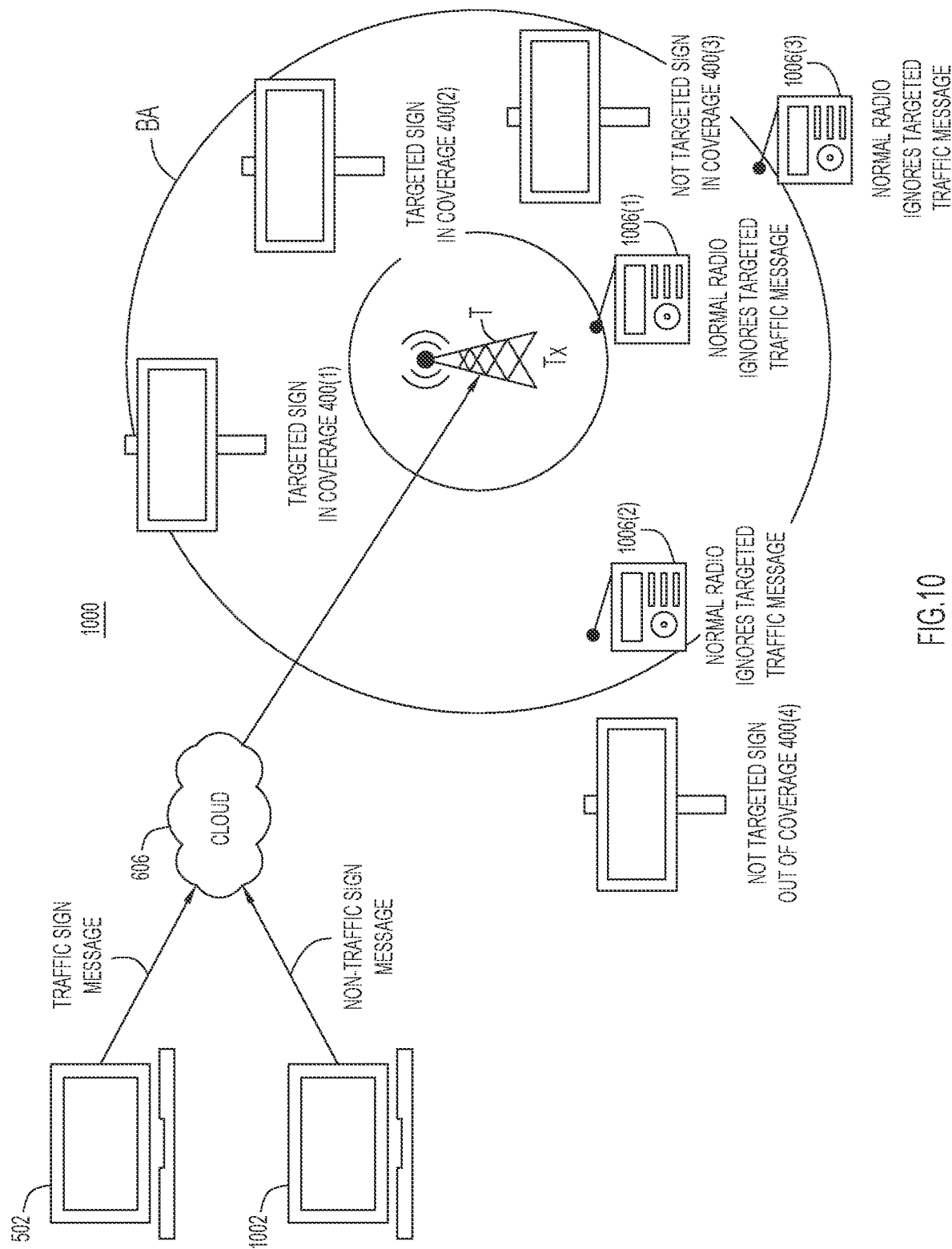
FIG. 10 is an illustration of another example transmission coverage scenario.

FIG. 10 is an illustration of another example transmission scenario 1000. In transmission scenario 1000, user terminals 502 and 1002 may be operated by a traffic control customer and a non-traffic control customer, respectively. User terminal 502 sends to cloud 606 a traffic sign message (which may be encrypted and RBDS encoded for analog FM transmission or encrypted and encoded for IBOC transmission) targeted to active traffic signs 400(1), 400(2), only. Cloud 606 distributes the traffic control message to radio broadcast transmitter T, which transmits a first radio broadcast signal as described above in connection with FIG. 9, for example. As in transmission scenario 900, active traffic signs 400(1), 400(2) recover the traffic sign message from the first radio broadcast signal, but active signs 400(3) and 400(4) do not.

User terminal 1002 sends a non-traffic sign message (e.g., a location message, an advertisement, and the like) targeted to "normal" radios 1006(1), 1006(2), and 1006(3) through cloud 606 and radio broadcast transmitter T. Radio broadcast transmitter T transmits a second broadcast radio signal (e.g., as an RBDS encoded analog FM radio broadcast signal or an IBOC radios broadcast signal) that carries the non-traffic sign message. Normal radios 1006(1)-1006(3) recover the non-traffic sign message from the radio broadcast signal, but do not recover the traffic sign message from the first radio broadcast signal.

Figure 11:
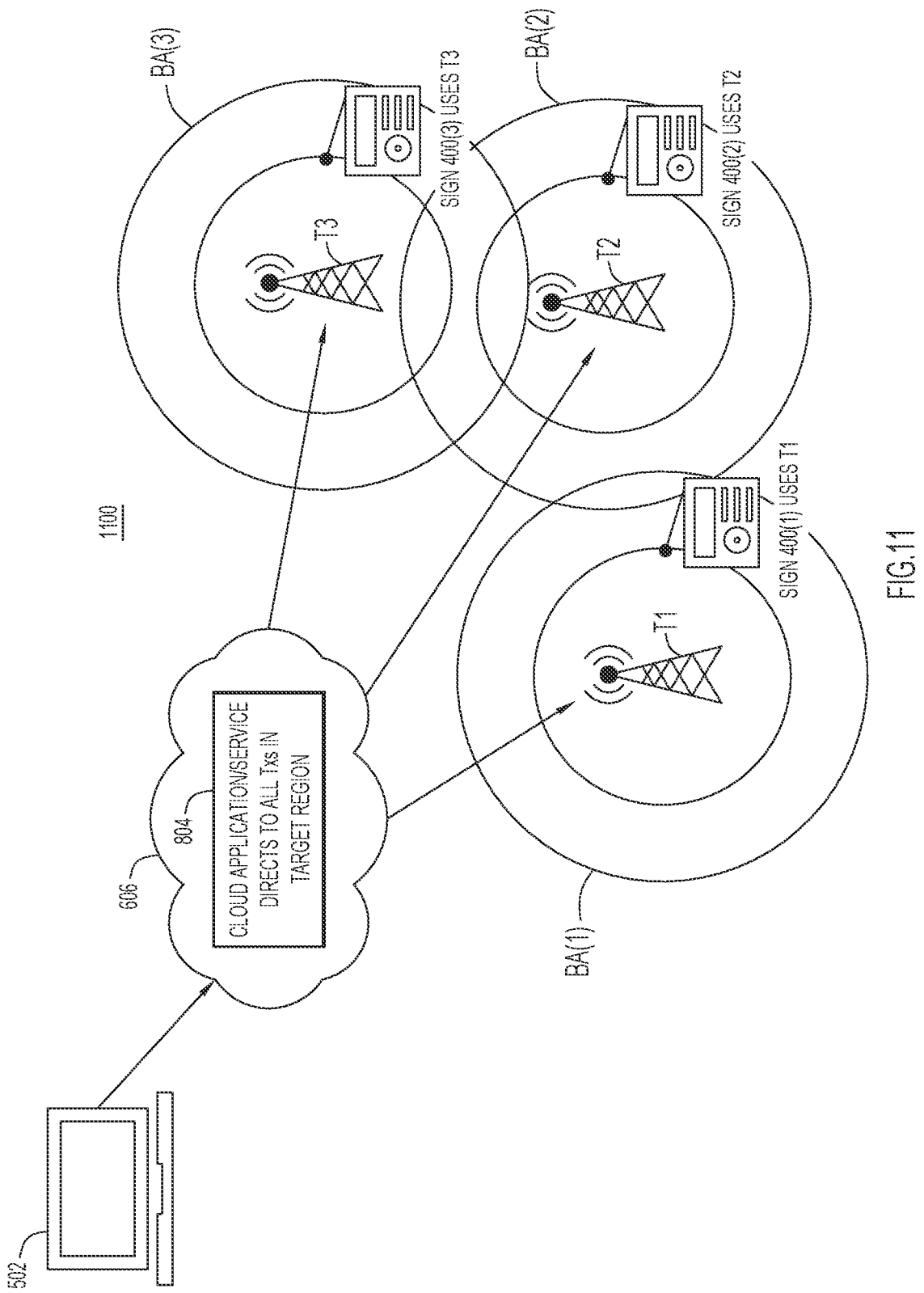
FIG. 11 is an illustration of yet another example transmission coverage scenario.

FIG. 11 is an illustration of another example transmission scenario 1100. In transmission scenario 1100, radio broadcast transmitters T1, T2, and T3 have respective broadcast coverage areas BA(1), BA(2), and BA(3). User terminal 502 sends traffic sign messages (which may be encrypted), targeted to active traffic signs 400(1), 400(2), and 400(3), to application/service 804 in cloud 606, which then directs the traffic sign messages to target region transmitters T1, T2, and T3, respectively. Target region transmitters T1, T2, and T3 transmit radio broadcast signals carrying the respective traffic sign messages. Active traffic signs 400(1), 400(2), and 400(3) located in coverage areas BA(1), BA(2), and BA3 recover the traffic sign messages from the radio broadcast signals.

Figure 12:
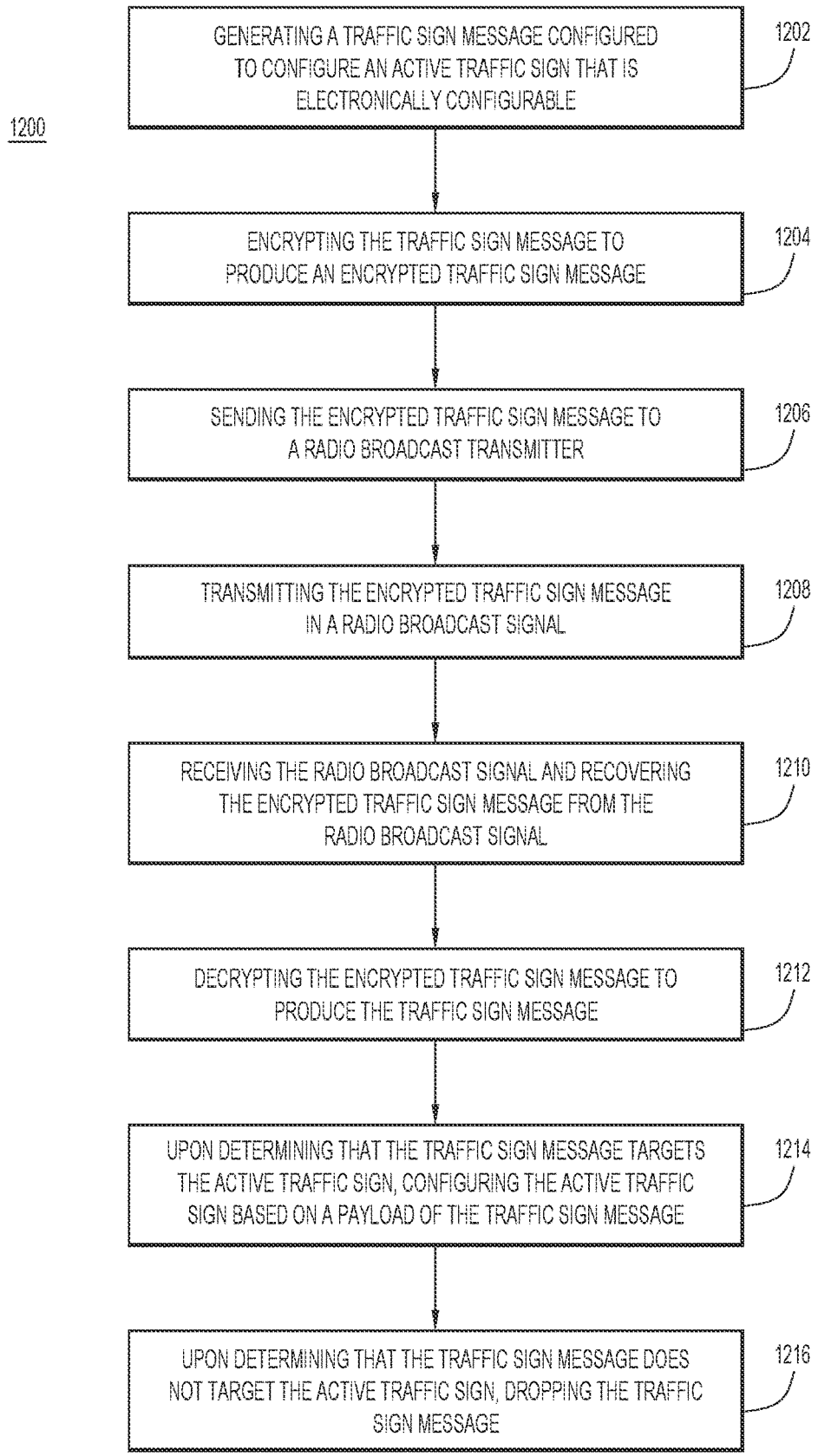
FIG. 12 is a flowchart of an example method of using radio broadcast transmissions to control an active traffic sign.

FIG. 12 is a flowchart of an example method 1200 of using broadcast radio transmissions to control an active traffic sign. Operations of method 1200 are described above.

1202 includes, at a user terminal (i.e., a user entry mechanism), generating a traffic sign message configured to configure or program an active traffic sign that is electronically configurable or programmable. The traffic sign message includes a unique ID of the active traffic sign and a payload containing information for configuring the active traffic sign. The unique ID may be a serial number of the active traffic sign, an address of the active traffic sign, or both.

1204 includes, at the user terminal, encrypting the traffic sign message using an encryption key that is also known to the active traffic sign to produce an encrypted traffic sign message. The encryption key may be the unique ID or any other key. Such encryption may be used to protect a traffic service provider data from abuse and, additionally, to differentiate between different traffic service providers based on the key.

1206 includes, from the user terminal, sending the encrypted traffic sign message to a radio broadcast transmitter. This may include encapsulating the encrypted traffic sign message in an IP packet with a destination IP address for the radio broadcast transmitter and, optionally, the unique ID of the active traffic sign, and sending the IP packet to the radio broadcast transmitter over a communication network. The destination IP address may be retrieved from a mapping database that maps identifiers of the active traffic sign to identifiers of the radio broadcast transmitter.

1208 includes, at the radio broadcast transmitter receiving the encrypted traffic sign message. 1028 further includes, at the radio broadcast transmitter, generating a radio broadcast signal, such as an IBOC all-digital or hybrid radio broadcast signal, encoded/modulated to carry the encrypted traffic sign message, and transmitting the radio broadcast signal, i.e., transmitting the encrypted traffic sign message in the radio broadcast signal. Alternatively, the method includes generating a radio broadcast, such as an analog FM signal augmented with RBDS (that carries an RBDS encoded encrypted traffic sign message), and transmitting the same in the radio broadcast signal.

Next operations 1210-1216 are performed at the active traffic sign.

1210 includes receiving the radio broadcast signal and recovering the encrypted traffic sign message from the radio broadcast signal, i.e., demodulating the received radio broadcast signal to recover the encrypted traffic sign message.

1212 includes decrypting the encrypted traffic sign message using a local key that matches the key used for encryption, to produce the traffic sign message.

1214 includes, upon determining that the traffic sign message targets the active traffic sign when the unique ID (e.g., an address or other identifier) in the traffic sign message matches a locally stored unique ID (e.g., address or other identifier) of the active traffic sign, configuring the active traffic sign according to the traffic sign message, e.g., based on the payload of the traffic sign message. In an example in which the active traffic sign includes a programmable array of lights, configuring includes programming the array of lights to display a traffic control message (e.g., as a string of characters or an alphanumeric string) conveyed in the payload.

1216 includes, upon determining that the traffic sign message does not target the active traffic sign, dropping the traffic sign message (and not configuring the active traffic sign according to the traffic sign message).

Figure 13:
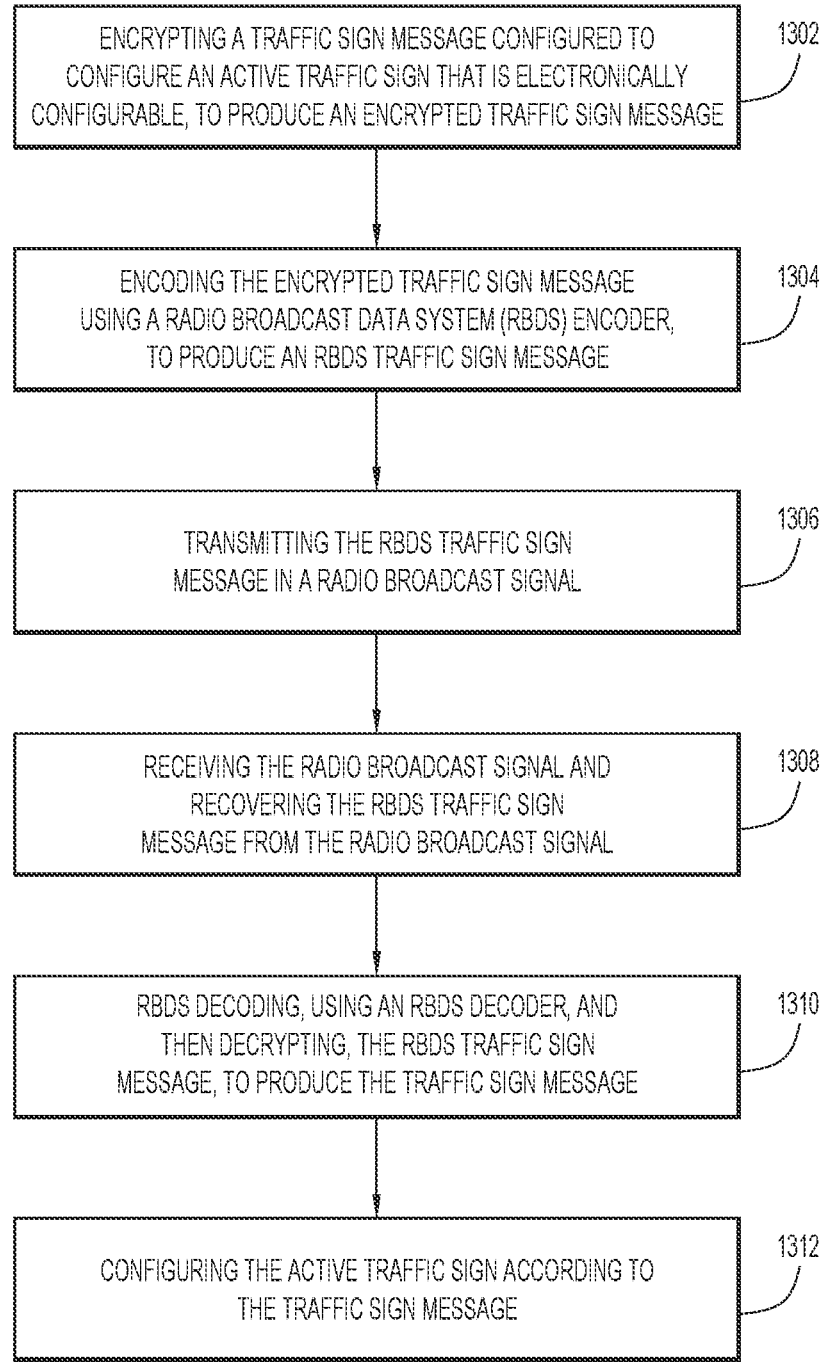
FIG. 13 is a flowchart of another example method of using radio broadcast transmissions to control an active traffic sign.

FIG. 13 is a flowchart of another example method 1300 of using broadcast radio transmissions to control an active traffic sign. Operations of method 1300 are described above.

1302 includes, at a user terminal, creating and encrypting a traffic sign message configured to configure an active traffic sign that is electronically configurable, to produce an encrypted traffic sign message.

1304 includes RBDS encoding the encrypted traffic sign message using an RBDS encoder, to produce an RBDS encoded encrypted traffic sign message (also referred to simply as an "RBDS traffic sign message").

1306 includes, at a radio broadcast transmitter, transmitting the RBDS traffic sign message in a radio broadcast signal, such as an analog FM radio broadcast signal augmented with the RBDS.

One example includes encrypting and RBDS encoding to produce the RBDS traffic sign message, and then sending the RBDS traffic sign message to the radio broadcast transmitter message in an IP packet addressed to the radio broadcast transmitter, over a communication network. Another example includes, prior to any encoding using the RBDS encoder, encrypting the traffic sign message to produce an encrypted traffic sign message, sending the encrypted traffic sign message to the radio broadcast transmitter, and then RBDS encoding the encrypted traffic sign message into the RBDS traffic sign message at the radio broadcast transmitter.

Next operations 1308-1312 are performed at the active traffic sign.

1308 includes receiving the radio broadcast signal and recovering the RBDS traffic sign message (i.e., the RBDS encoded encrypted traffic sign message) from the radio broadcast signal, i.e., demodulating the received signal.

1310 includes RBDS decoding, using an RBDS decoder, and then decrypting, the RBDS traffic sign message, to produce the traffic sign message.

1312 includes configuring the active traffic sign according to the traffic sign message.

Figure 14:
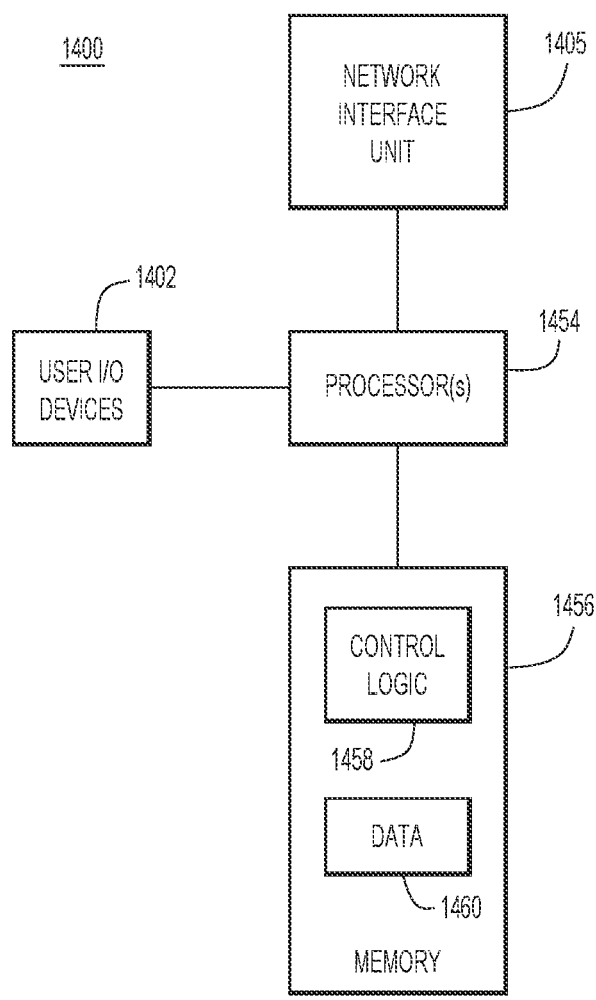
FIG. 14 is a block diagram of an example computer device that may be implemented in any of a user terminal, a target region broadcaster, and an active traffic sign to perform operations described herein.

FIG. 14 is a block diagram of an example controller or computer device 1400 that may be implemented in any a user terminal, a target region broadcaster, and an active traffic sign to perform operations described herein. There are numerous possible configurations for computer device 1400 and FIG. 14 is meant to be an example. Examples of computer device 1400 include a tablet computer, a personal computer, a laptop computer, a mobile phone, such as a smartphone, embedded electronics in a transmitter or in an active sign, and so on.

Computer device 1400 may include user input/output (I/O) devices 1402 including a display, keyboard, and the like to enable a user to enter information into and receive information from the computer device. Computer device 1400 includes a hardware and/or software implemented network interface unit 1405 to communicate with a wired and/or wireless communication network, and to control devices over the network. Computer device 1400 also includes a processor 1454 (or multiple processors, which may be implemented as software or hardware processors), and memory 1456. Network interface unit 1405 may include an Ethernet card with a port (or multiple such devices) to communicate over wired Ethernet links and/or a wireless communication card with a wireless transceiver to communicate over wireless links. Network interface unit 1405 can connect to a cloud distribution system to connect to multiple radio broadcast stations, or can be directly connected to one radio broadcast station, where the radio broadcast stations can be for analog or digital FM transmitter system, for example.

Memory 1456 stores instructions for implementing methods described herein. Memory 1456 may include read only memory (ROM), random access memory (RAM), magnetic disk storage media devices, optical storage media devices, flash memory devices, electrical, optical, or other physical/tangible (non-transitory) memory storage devices. The processor 1454 is, for example, a microprocessor or a microcontroller that executes instructions stored in memory. Thus, in general, the memory 1456 may comprise one or more tangible computer readable storage media (e.g., a memory device) encoded with software comprising computer executable instructions and when the software is executed (by the processor 1454) it is operable to perform (e.g., cause the processor to perform) the operations described herein. For example, memory 1456 stores control logic 1458 to perform operations described herein.

The memory 1456 may also store data 1460 used and generated by control logic 1458.

Figure 15:
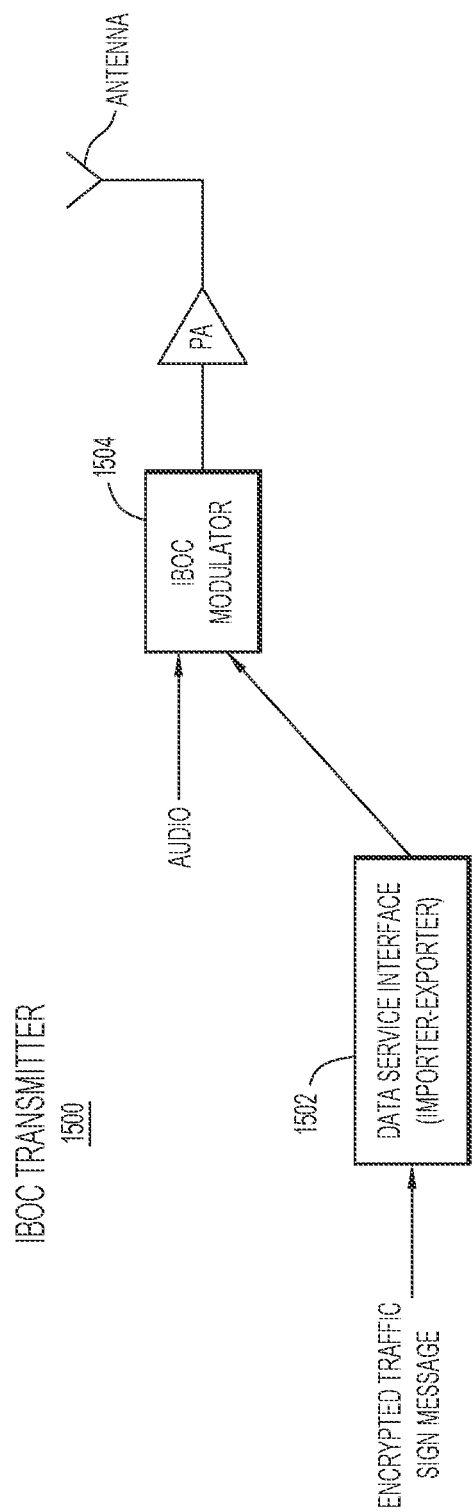
FIG. 15 is a simplified block diagram of an example IBOC transmitter.

FIG. 15 is a simplified block diagram of an example IBOC transmitter 1500. IBOC transmitter 1500 includes a data service interface (also referred to as an "importer-exporter") 1502 that converts an encrypted traffic sign message to data appropriately formatted for an IBOC modulator 1504. IBOC modulator 1504 receives audio and the data formatted by data service interface 1502, and generates an IBOC hybrid radio broadcast signal for transmission based on the inputs. IBOC modulator 1504 may employ any known or hereafter developed IBOC modulation techniques for generating IBOC hybrid and all-digital radio broadcast signals from the inputs described above. The IBOC hybrid radio broadcast signal is transmitted through a transmit power amplifier (PA) and an antenna. In the absence of the audio, IBOC modulator 1504 may generate an IBOC all-digital radio broadcast signal for transmission.

FIG. 16 is a simplified block diagram of an example RBDS-augmented/capable transmitter 1600. Transmitter 1600 includes an RBDS data FM modulator 1602 to FM modulate RBDS encoded data and an audio FM modulator 1604 to FM modulate audio. A cloud distribution system as described above may be used to provide the RBDS encoded data to ensure maximum coverage for redundancy and better coverage in a given geographical area. Modulated outputs of RBDS data FM modulator 1602 and audio FM modulator 1604 feed respective inputs of a combiner 1606, which combines the modulated outputs into an analog FM radio broadcast signal augmented with the RBDS data to be transmitted through a transmit power amplifier (PA) and an antenna. More generally, transmitter 1600 may employ any known or hereafter developed FM modulation techniques to generate the analog FM radio broadcast signal augmented with the RBDS data described herein.

Embodiments presented herein are described in the context of IBOC radio broadcast and analog FM radio broadcast augmented with the RBDS by way of example, only. It is understood that the embodiments apply more generally to, and may be implemented in, any digital radio broadcast technology, including the IBOC technology, digital audio broadcast (DAB) technology, and satellite broadcast technology, and in any other analog modulation technologies. All such radio broadcast technologies may support transmission of the traffic sign messages to active traffic signs in accordance with the embodiments presented herein.

Note that in this Specification, references to various features (e.g., elements, structures, modules, components, logic, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations described with reference to the preceding figures illustrate only some of the possible scenarios that may be executed by one or more entities and components discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Additionally, unless expressly stated to the contrary, the terms 'first', 'second', 'third', etc., are intended to distinguish the particular nouns they modify (e.g., element, condition, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Although the techniques are illustrated and described herein as embodied in one or more specific examples, it is nevertheless not intended to be limited to the details shown, since various modifications and structural changes may be made within the scope and range of equivalents of the claims.

In some aspects, the techniques described herein relate to a method including: generating a traffic sign message configured to configure an active traffic sign that is electronically configurable; encrypting the traffic sign message to produce an encrypted traffic sign message; sending the encrypted traffic sign message to a radio broadcast transmitter; and at the radio broadcast transmitter, transmitting the encrypted traffic sign message in a radio broadcast signal; and at the active traffic sign: receiving the radio broadcast signal and recovering the encrypted traffic sign message from the radio broadcast signal; decrypting the encrypted traffic sign message to produce the traffic sign message; and configuring the active traffic sign according to the traffic sign message.

In some aspects, the techniques described herein relate to a method, wherein: transmitting the encrypted traffic sign message includes transmitting the encrypted traffic sign message in an in-band on-channel (IBOC) hybrid radio broadcast signal or an all-digital IBOC radio broadcast signal.

In some aspects, the techniques described herein relate to a method, wherein the traffic sign message includes: a traffic sign identifier for the active traffic sign; and a payload including information for configuring the active traffic sign.

In some aspects, the techniques described herein relate to a method, wherein: the active traffic sign includes a programmable array of lights; and configuring includes programming the programmable array of lights to display a traffic control message conveyed in the payload.

In some aspects, the techniques described herein relate to a method, wherein the active traffic sign is programmed with a local traffic sign identifier for the active traffic sign, and the method further includes, at the active traffic sign: upon determining that the traffic sign identifier in the traffic sign message matches the local traffic sign identifier, performing configuring the active traffic sign based on the payload.

In some aspects, the techniques described herein relate to a method, further including, at the active traffic sign: upon determining that the traffic sign identifier in the traffic sign message does not match the local traffic sign identifier, dropping the traffic sign message.

In some aspects, the techniques described herein relate to a method, further including: encapsulating the encrypted traffic sign message in an internet protocol (IP) packet with a destination address for the radio broadcast transmitter, wherein sending includes sending the IP packet to the radio broadcast transmitter over a communication network.

In some aspects, the techniques described herein relate to a method including: encrypting a traffic sign message configured to configure an active traffic sign that is electronically configurable, to produce an encrypted traffic sign message; encoding the encrypted traffic sign message using a radio broadcast data system (RBDS) encoder, to produce an RBDS traffic sign message; at a radio broadcast transmitter, transmitting the RBDS traffic sign message in a radio broadcast signal; and at the active traffic sign: receiving the radio broadcast signal and recovering the RBDS traffic sign message from the radio broadcast signal; RBDS decoding, using an RBDS decoder, and then decrypting, the RBDS traffic sign message, to produce the traffic sign message; and configuring the active traffic sign according to the traffic sign message.

In some aspects, the techniques described herein relate to a method, wherein: transmitting the RBDS traffic sign message includes transmitting the RBDS traffic sign message in an analog frequency modulation (FM) radio broadcast signal.

In some aspects, the techniques described herein relate to a method, wherein the traffic sign message includes: a traffic sign identifier for the active traffic sign; and a payload including information for configuring the active traffic sign.

In some aspects, the techniques described herein relate to a method, wherein: the active traffic sign includes a programmable array of lights; and configuring includes programming the programmable array of lights to display a traffic control message conveyed in the payload.

In some aspects, the techniques described herein relate to a method, wherein the active traffic sign is programmed with a local traffic sign identifier for the active traffic sign, and the method further includes, at the active traffic sign: upon determining that the traffic sign identifier in the traffic sign message matches the local traffic sign identifier, performing configuring the active traffic sign based on the payload.

In some aspects, the techniques described herein relate to a method, further including, at the active traffic sign: upon determining that the traffic sign identifier in the traffic sign message does not match the local traffic sign identifier, dropping the traffic sign message.

In some aspects, the techniques described herein relate to a method, further including: sending the RBDS traffic sign message to the radio broadcast transmitter over a communication network.

In some aspects, the techniques described herein relate to a method, further including: prior to encoding using the RBDS encoder, sending the encrypted traffic sign message to the radio broadcast transmitter over a communication network; and at the radio broadcast transmitter, performing encoding the encrypted traffic sign message using the RBDS encoder.

In some aspects, the techniques described herein relate to a system including: a radio broadcast transmitter; an active traffic sign that is electronically configurable; and a computer device configure to perform: generating a traffic sign message configured to configure the active traffic sign; encrypting the traffic sign message to produce an encrypted traffic sign message; and sending the encrypted traffic sign message to the radio broadcast transmitter, wherein the radio broadcast transmitter is configured to perform transmitting the encrypted traffic sign message in a radio broadcast signal, wherein the active traffic sign is configured to perform: receiving the radio broadcast signal and recovering the encrypted traffic sign message from the radio broadcast signal; decrypting the encrypted traffic sign message to produce the traffic sign message; and configuring the active traffic sign according to the traffic sign message.

In some aspects, the techniques described herein relate to a system, wherein: the radio broadcast transmitter is configured to perform transmitting the encrypted traffic sign message by transmitting the encrypted traffic sign message in an in-band on-channel (IBOC) hybrid radio broadcast signal or an all-digital IBOC radio broadcast signal.

In some aspects, the techniques described herein relate to a system, wherein the traffic sign message includes: a traffic sign identifier for the active traffic sign; and a payload including information for configuring the active traffic sign.

In some aspects, the techniques described herein relate to a system, wherein: the active traffic sign includes a programmable array of lights; and the active traffic sign is configured to perform configuring by programming the programmable array of lights to display a traffic control message conveyed in the payload.

In some aspects, the techniques described herein relate to a system, wherein the active traffic sign is programmed with a local traffic sign identifier for the active traffic sign, and the active traffic sign is further configured to perform: upon determining that the traffic sign identifier in the traffic sign message matches the local traffic sign identifier, performing configuring the active traffic sign based on the payload.

In some aspects, the techniques described herein relate to a system, wherein the active traffic sign is further configured to perform: upon determining that the traffic sign identifier in the traffic sign message does not match the local traffic sign identifier, dropping the traffic sign message.

In some aspects, the techniques described herein relate to non-transitory computer readable media encoded with instructions that, when executed by one or more processors (e.g., of a user terminal, a radio broadcast transmitter, and an active sign), cause the one or more processors to perform: generating a traffic sign message configured to configure an active traffic sign that is electronically configurable; encrypting the traffic sign message to produce an encrypted traffic sign message; sending the encrypted traffic sign message to a radio broadcast transmitter; and at the radio broadcast transmitter, transmitting the encrypted traffic sign message in a radio broadcast signal; and at the active traffic sign: receiving the radio broadcast signal and recovering the encrypted traffic sign message from the radio broadcast signal; decrypting the encrypted traffic sign message to produce the traffic sign message; and configuring the active traffic sign according to the traffic sign message.

In some aspects, the techniques described herein relate to non-transitory computer readable media encoded with instructions that, when executed by one or more processors, cause the one or more processors to perform: encrypting a traffic sign message configured to configure an active traffic sign that is electronically configurable, to produce an encrypted traffic sign message; encoding the encrypted traffic sign message using a radio broadcast data system (RBDS) encoder, to produce an RBDS traffic sign message; at a radio broadcast transmitter, transmitting the RBDS traffic sign message in a radio broadcast signal; and at the active traffic sign: receiving the radio broadcast signal and recovering the RBDS traffic sign message from the radio broadcast signal; RBDS decoding, using an RBDS decoder, and then decrypting, the RBDS traffic sign message, to produce the traffic sign message; and configuring the active traffic sign according to the traffic sign message.

In some aspects, the techniques described herein relate to non-transitory media encoded with instructions that, when executed by one or more processors, cause the one or more processors to perform methods presented herein.

In some aspects, the techniques described herein relate to non-transitory computer readable media encoded with instructions that, when executed by one or more processors (e.g., of a user terminal, a radio broadcast transmitter, and an active sign), cause the one or more processors to perform: generating a traffic sign message configured to configure an active traffic sign that is electronically configurable; encrypting the traffic sign message to produce an encrypted traffic sign message; sending the encrypted traffic sign message to a radio broadcast transmitter; and at the radio broadcast transmitter, transmitting the encrypted traffic sign message in a radio broadcast signal; and at the active traffic sign: receiving the radio broadcast signal and recovering the encrypted traffic sign message from the radio broadcast signal; decrypting the encrypted traffic sign message to produce the traffic sign message; and configuring the active traffic sign according to the traffic sign message.

In some aspects, the techniques described herein relate to non-transitory computer readable media encoded with instructions that, when executed by one or more processors, cause the one or more processors to perform: encrypting a traffic sign message configured to configure an active traffic sign that is electronically configurable, to produce an encrypted traffic sign message; encoding the encrypted traffic sign message using a radio broadcast data system (RBDS) encoder, to produce an RBDS traffic sign message; at a radio broadcast transmitter, transmitting the RBDS traffic sign message in a radio broadcast signal; and at the active traffic sign: receiving the radio broadcast signal and recovering the RBDS traffic sign message from the radio broadcast signal; RBDS decoding, using an RBDS decoder, and then decrypting, the RBDS traffic sign message, to produce the traffic sign message; and configuring the active traffic sign according to the traffic sign message.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
    generating a traffic sign message configured to configure an active traffic sign that is electronically configurable;
    encrypting the traffic sign message to produce an encrypted traffic sign message;
    sending the encrypted traffic sign message to a radio broadcast transmitter; and
    at the radio broadcast transmitter, transmitting the encrypted traffic sign message in a radio broadcast signal; and
    at the active traffic sign:
        receiving the radio broadcast signal and recovering the encrypted traffic sign message from the radio broadcast signal;
        decrypting the encrypted traffic sign message to produce the traffic sign message; and
        configuring the active traffic sign according to the traffic sign message.

2. The method of claim 1, wherein:
    transmitting the encrypted traffic sign message includes transmitting the encrypted traffic sign message in an in-band on-channel (IBOC) hybrid radio broadcast signal or IBOC all-digital radio broadcast signal.

3. The method of claim 1, wherein the traffic sign message includes:
    a traffic sign identifier for the active traffic sign; and
    a payload including information for configuring the active traffic sign.

4. The method of claim 3, wherein:
    the active traffic sign includes a programmable array of lights; and
    configuring includes programming the programmable array of lights to display a traffic control message conveyed in the payload.

5. The method of claim 3, wherein the active traffic sign is programmed with a local traffic sign identifier for the active traffic sign, and the method further comprises, at the active traffic sign:
    upon determining that the traffic sign identifier in the traffic sign message matches the local traffic sign identifier, performing configuring the active traffic sign based on the payload.

6. The method of claim 5, further comprising, at the active traffic sign:
    upon determining that the traffic sign identifier in the traffic sign message does not match the local traffic sign identifier, dropping the traffic sign message.

7. The method of claim 1, further comprising:
    encapsulating the encrypted traffic sign message in an internet protocol (IP) packet with a destination address for the radio broadcast transmitter,
    wherein sending includes sending the IP packet to the radio broadcast transmitter over a communication network.

8. A method comprising:
    encrypting a traffic sign message configured to configure an active traffic sign that is electronically configurable, to produce an encrypted traffic sign message;
    encoding the encrypted traffic sign message using a radio broadcast data system (RBDS) encoder, to produce an RBDS traffic sign message;
    at a radio broadcast transmitter, transmitting the RBDS traffic sign message in a radio broadcast signal; and
    at the active traffic sign:
        receiving the radio broadcast signal and recovering the RBDS traffic sign message from the radio broadcast signal;
        RBDS decoding, using an RBDS decoder, and then decrypting, the RBDS traffic sign message, to produce the traffic sign message; and
        configuring the active traffic sign according to the traffic sign message.

9. The method of claim 8, wherein:
transmitting the RBDS traffic sign message includes transmitting the RBDS traffic sign message in an analog frequency modulation (FM) radio broadcast signal.

10. The method of claim 8, wherein the traffic sign message includes:
a traffic sign identifier for the active traffic sign; and
a payload including information for configuring the active traffic sign.

11. The method of claim 10, wherein:
the active traffic sign includes a programmable array of lights; and
configuring includes programming the programmable array of lights to display a traffic control message conveyed in the payload.

12. The method of claim 10, wherein the active traffic sign is programmed with a local traffic sign identifier for the active traffic sign, and the method further comprises, at the active traffic sign:
upon determining that the traffic sign identifier in the traffic sign message matches the local traffic sign identifier, performing configuring the active traffic sign based on the payload.

13. The method of claim 12, further comprising, at the active traffic sign:
upon determining that the traffic sign identifier in the traffic sign message does not match the local traffic sign identifier, dropping the traffic sign message.

14. The method of claim 8, further comprising:
sending the RBDS traffic sign message to the radio broadcast transmitter over a communication network.

15. The method of claim 8, further comprising:
prior to encoding using the RBDS encoder, sending the encrypted traffic sign message to the radio broadcast transmitter over a communication network; and
at the radio broadcast transmitter, performing encoding the encrypted traffic sign message using the RBDS encoder.

16. A system comprising:
a radio broadcast transmitter;
an active traffic sign that is electronically configurable; and
a computer device configure to perform:
generating a traffic sign message configured to configure the active traffic sign;
encrypting the traffic sign message to produce an encrypted traffic sign message; and
sending the encrypted traffic sign message to the radio broadcast transmitter,
wherein the radio broadcast transmitter is configured to perform transmitting the encrypted traffic sign message in a radio broadcast signal,
wherein the active traffic sign is configured to perform:
receiving the radio broadcast signal and recovering the encrypted traffic sign message from the radio broadcast signal;
decrypting the encrypted traffic sign message to produce the traffic sign message; and
configuring the active traffic sign according to the traffic sign message.

17. The system of claim 16, wherein:
the radio broadcast transmitter is configured to perform transmitting the encrypted traffic sign message by transmitting the encrypted traffic sign message in an in-band on-channel (IBOC) hybrid radio broadcast signal or an IBOC all-digital radio broadcast signal.

18. The system of claim 16, wherein the traffic sign message includes:
a traffic sign identifier for the active traffic sign; and
a payload including information for configuring the active traffic sign.

19. The system of claim 18, wherein:
the active traffic sign includes a programmable array of lights; and
the active traffic sign is configured to perform configuring by programming the programmable array of lights to display a traffic control message conveyed in the payload.

20. The system of claim 18, wherein the active traffic sign is programmed with a local traffic sign identifier for the active traffic sign, and the active traffic sign is further configured to perform:
upon determining that the traffic sign identifier in the traffic sign message matches the local traffic sign identifier, performing configuring the active traffic sign based on the payload.

21. The system of claim 20, wherein the active traffic sign is further configured to perform:
upon determining that the traffic sign identifier in the traffic sign message does not match the local traffic sign identifier, dropping the traffic sign message.

* * * * *